Dec. 20, 1960 P. C. SHERBURNE 2,965,341

CONSTANT SUPPORT DEVICES

Filed May 13, 1955 8 Sheets-Sheet 1

INVENTOR.
PHILIP C. SHERBURNE
BY David D. McKenney
ATTORNEY

Dec. 20, 1960 P. C. SHERBURNE 2,965,341

CONSTANT SUPPORT DEVICES

Filed May 13, 1955 8 Sheets-Sheet 2

INVENTOR.

PHILIP C. SHERBURNE

BY

David D. McHenney

ATTORNEY

Dec. 20, 1960 P. C. SHERBURNE 2,965,341

CONSTANT SUPPORT DEVICES

Filed May 13, 1955 8 Sheets-Sheet 3

INVENTOR.

PHILIP C. SHERBURNE

BY David D. McKenney

ATTORNEY

INVENTOR.
PHILIP C. SHERBURNE
BY David D. McKenney
ATTORNEY

INVENTOR.
PHILIP C. SHERBURNE
BY
David D. McKenney
ATTORNEY

Dec. 20, 1960 P. C. SHERBURNE 2,965,341

CONSTANT SUPPORT DEVICES

Filed May 13, 1955 8 Sheets-Sheet 6

INVENTOR.
PHILIP C. SHERBURNE
BY
David D. McKenney
ATTORNEY

CONSTANT SUPPORT DEVICES

Filed May 13, 1955

INVENTOR.

PHILIP C. SHERBURNE

BY David D. McKenney

ATTORNEY

*INVENTOR.*

PHILIP C. SHERBURNE

*BY*

David D. McKenney

ATTORNEY

United States Patent Office 2,965,341
Patented Dec. 20, 1960

2,965,341

CONSTANT SUPPORT DEVICES

Philip C. Sherburne, Rumford, R.I., assignor to Grinnell Corporation, Providence, R.I., a corporation of Delaware Filed May 13, 1955, Ser. No. 508,218

23 Claims. (Cl. 248—54)

This invention relates to improvements in constant support devices and more particularly has to do with spring hangers for exerting on a body movable within a limited range a constant force along the line of said movement.

An example of such a body is a section of piping system which carries a fluid subject to temperature changes and which expands and contracts as a result of these changes. The section must have its weight supported in such a way that the supporting effort remains substantially constant although expansion and contraction cause the section to move vertically.

In past years constant support for piping systems was achieved by the use of spring devices in which each pipe section or "load" was suspended from a horizontally pivoted lever so that the weight of the load produced a turning moment about the lever pivot in one direction, and in which one or more springs were interposed between the lever and a fixed structure so that the force of the springs produced a turning moment on the lever opposing the load turning moment. By a judicious arrangement of parts the spring moment could be made to approximate the load moment through that angle of rotation of the lever which would result from the vertical movement of the section upon expansion and contraction of the system. Such devices were satisfactory when they were developed and many are still in use today.

In more recent years, however, piping systems have been called upon to carry fluids at increasingly higher temperatures, and this, coupled with the use of increasingly higher pressures in these systems, necessitated a more nearly perfect constant support to minimize the undesirable stresses which appear in a piping system when the supporting effort does not exactly equal the pipe weight in every position of the pipe.

To meet these current, stringent requirements a spring support was recently devised which affords constant support considerably superior to that previously obtainable. This spring support in general comprises a frame with a lever pivoted thereon to rotate about a horizontal axis. This lever has a first arm from which the load is vertically suspended and a second arm which is angularly spaced about the lever pivot axis from this first arm and to which the spring is connected. The spring employed is of the type which has a linear force-deflection characteristic, for example, a helical compression spring. This spring is pivoted to the frame at such a location thereon that the angle between a vertical line through the lever pivot and the line defined by the spring and lever pivots equals the angle between the lever arms. In addition, the pivoted spring is arranged so that the distance from the spring pivot to the point of connection of the spring to the second lever arm equals the spring deflection, and further arranged so that the spring axis intersects both this spring pivot and point.

Constant support pipe hangers of this above-described construction are currently enjoying considerable success on the market, and this is to be expected on the basis of their supporting characteristics, because except for slight errors introduced by friction, by the effect of the weight of the hanger parts and by failure of the load to suspend exactly vertical from the first lever arm (errors found in every commercial constant support hanger) the support provided is perfect for any amount of lever rotation chosen. Otherwise stated, the devices previous to that described all included an error attributable to the then impossibility of making the theoretical spring moment exactly equal to the theoretical load moment even over a limited range of lever rotation. In the more recent device described these theoretical moments (by theoretical moments is meant the moments neglecting the three errors first mentioned) are exactly equal over any range of lever rotation.

Whereas this appreciable improvement in supporting characteristics is desirable, it has thus far been accompanied in commercial constant support hangers by an undesirable rotation of the spring as the lever rotates. Such spring rotation is best avoided because there are frequently piping sections to be supported which are so located that while space is available in which a hanger may be located with the lever in one position, there is not sufficient space to accommodate the swinging of the spring which accompanies rotation of the lever to a new position upon movement of the load. With any hanger having such a swinging spring the planning by engineers as to hanger installation in "tight" places is considerably complicated, because in selecting a hanger location allowance must be made for the swinging spring, and where the space at the preferred location is insufficient for the hanger required there by the pipe load, special auxiliary pipe attachments frequently have to be designed and provided to locate that hanger where there is room for it and where it can still exert its support on the pipe at the proper point.

In addition to the undesirable spring rotation which accompanies lever rotation, the arrangement in these described hangers for adjusting the supporting effort in the field causes the spring to assume a different position from that which it assumes before such adjustment. Thus, if, for the adjustment setting made at the factory, the spring swings through a certain range with respect to the frame upon pipe movement; after such field adjustment as may be necessary the range through which the spring will swing upon pipe movement, while similar in magnitude to the range of swing before adjustment, will be newly located with respect to the frame. This shift of the spring due to adjustment must also be taken into account by the engineers.

Furthermore, even where there is no field adjustment required, the position of the spring with respect to the frame still cannot be accurately foretold by the engineer because of the tolerances permitted the spring manufacturer. Thus, springs ordered for use in such devices on specifications calling for a 100 pounds per inch constant may have actual constants of from 95 to 105 pounds per inch, and in a device with a spring having a 95 pounds per inch constant a factory setting to accommodate a given load will locate the spring at a different position with respect to the frame than in the case of a device which is factory set to accommodate the same load and which is exactly the same except that it has a spring with a 105 pounds per inch constant.

The present invention has to do with the provision of a constant spring support in which the spring is fixed, but in which the arrangement of parts otherwise closely approximates that described arrangement which affords theoretical constant support. In this manner and by a construction which will be more particularly described hereinafter the advantages of a fixed spring device are realized, and at the same time a surprisingly satisfactory and superior support characteristic results with appreciable lever rotation.

In general one device in accordance with the present invention has a frame adapted to be fixedly mounted with respect to a fixed structure such as a building frame. A lever is pivoted on the frame to rotate about an axis which is horizontal when the frame is thus mounted. This lever has a first arm to a point on which the load is pivotally secured and a second arm which may be coincidental with the first arm or angularly spaced apart therefrom about the lever pivot axis. This second lever arm has pivoted thereto one end of a tie-rod whose other end is pivoted to a member engaging one end of a spring. This spring is of the type which has a linear force-deflection characteristic and has its other end fixed with respect to the frame. In addition the spring is guided by structure fixed with respect to the frame so that the spring end engaging member is movable substantially only along that line in which the spring is normally intended to be deflected. The spring and lever are so positioned with respect to each other that the tie-rod remains generally coincidental with the normal deflection line of the spring when viewed along the lever pivot axis, as the lever rotates throughout the range necessary to accommodate pipe movement. And, finally, the spring deflection is substantially equal to the distance between the pivot at the one end of the tie-rod and the point where the line defined by the tie-rod pivots is intersected by a line from the lever pivot angularly spaced from the vertical through the lever pivot by the angle between the lever arms.

By this particular arrangement I have discovered that a substantial amount of lever rotation can take place and that the maximum inequality of the theoretical spring and load moments during such rotation, due to prevention of spring rotation, is sufficiently small to result in a device which is completely satisfactory from the point of view of constancy of support. At the same time the very considerable advantages of a fixed, non-rotating spring are realized.

Accordingly, one object of the present invention is to provide a constant support spring device in which the spring does not swing during lever rotation or during adjustment of the supporting effort and in which a very satisfactory constancy of support is realized over an appreciable range of lever rotation.

Another object of the invention is to provide a device of the kind described in which the spring has one end fixed against movement in any direction and has its other end guided so as to move only along the line of deflection normally intended for said spring.

Another object of the invention is to provide a device of the kind described in which a tie-rod is connected between the other spring end and the spring arm of the lever and in which this tie-rod remains generally coincidental with the line of normal spring deflection throughout rotation of the lever caused by vertical load movement.

Another object of the invention is to provide a device of the kind described in which the spring deflection is substantially equal to the distance between the point of connection of the tie-rod to the lever spring arm and the point on the line defined by the tie-rod pivots where the same is intersected by a radial line from the lever pivot which is angularly spaced from a vertical through the lever pivot by the angle between the lever's spring and load arms.

Another object is to provide a device of the kind described in which the tie-rod is pivotally connected to the lever's spring arm at one end and to the guided spring end at its other end.

Another object is to provide a device of the kind described in which the fixed spring end is located as close as possible to the tie-rod connection to the spring arm when the lever is at that end of its limited range of rotation in which the spring is least deflected.

Another object is to provide a device of the kind described in which the point of connection of the tie-rod to the spring arm of the lever is adjustable along a certain path to change the magnitude of the constant supporting effort exerted.

Other objects will appear hereinafter.

The best modes in which it has been contemplated applying the principles of the present invention are shown in the accompanying drawings, but the latter are to be deemed merely illustrative because it is intended that the patent shall cover by suitable expression in the appended claims whatever features of patentable novelty exist in the invention disclosed.

Figures 3, 4:
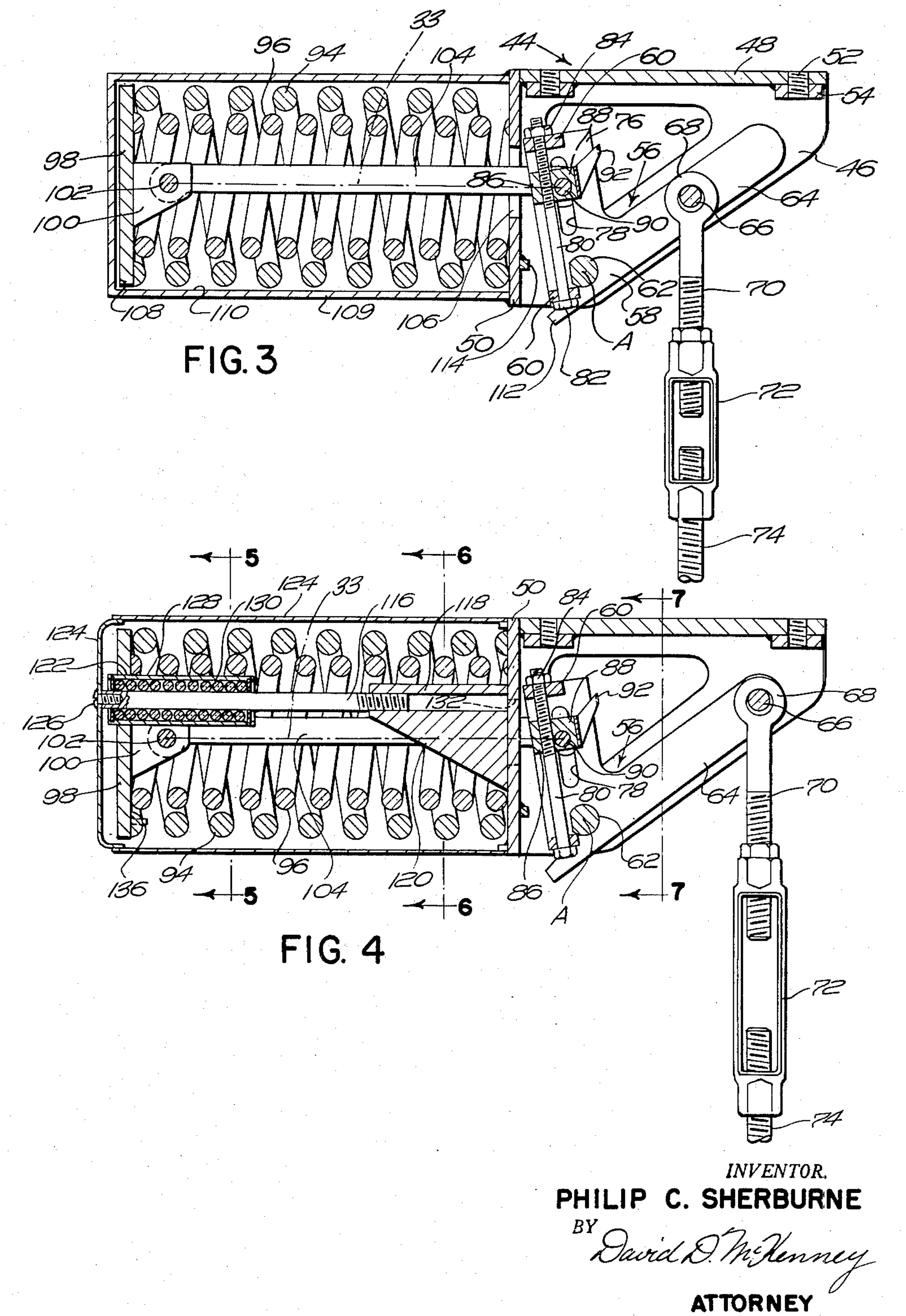
Fig. 3 is a cross sectioned side elevation view of an embodiment in more structural detail and showing one form of spring guiding means.
Fig. 4 is a view like Fig. 3 but showing another form of spring guiding means.
Figures 5, 6, 7:
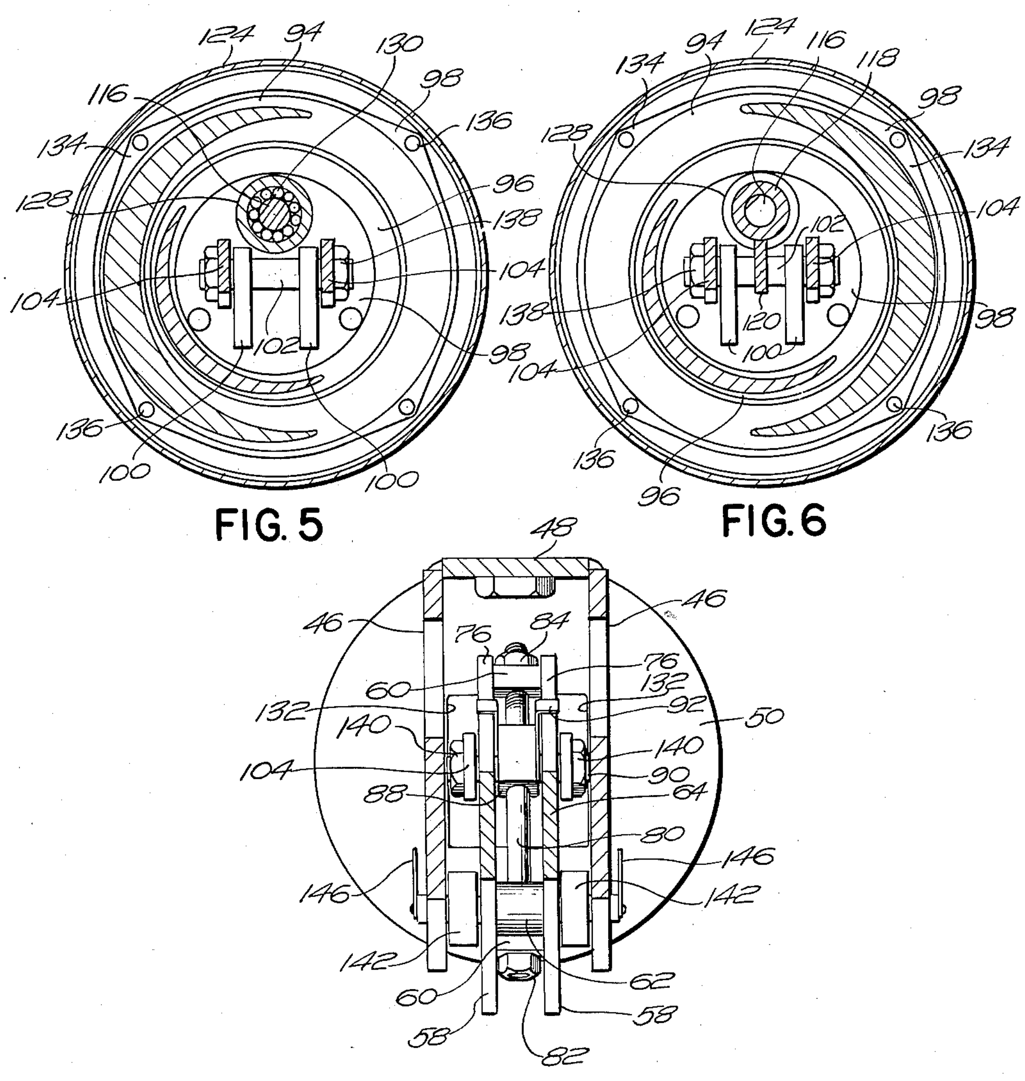
Figure 8:
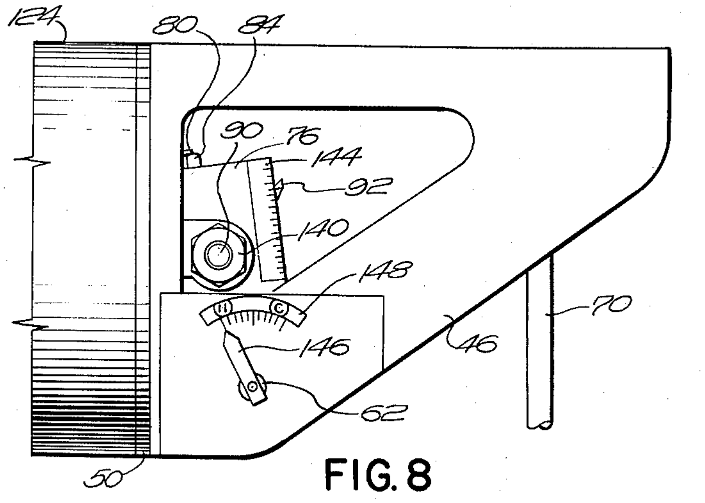
Figure 9:
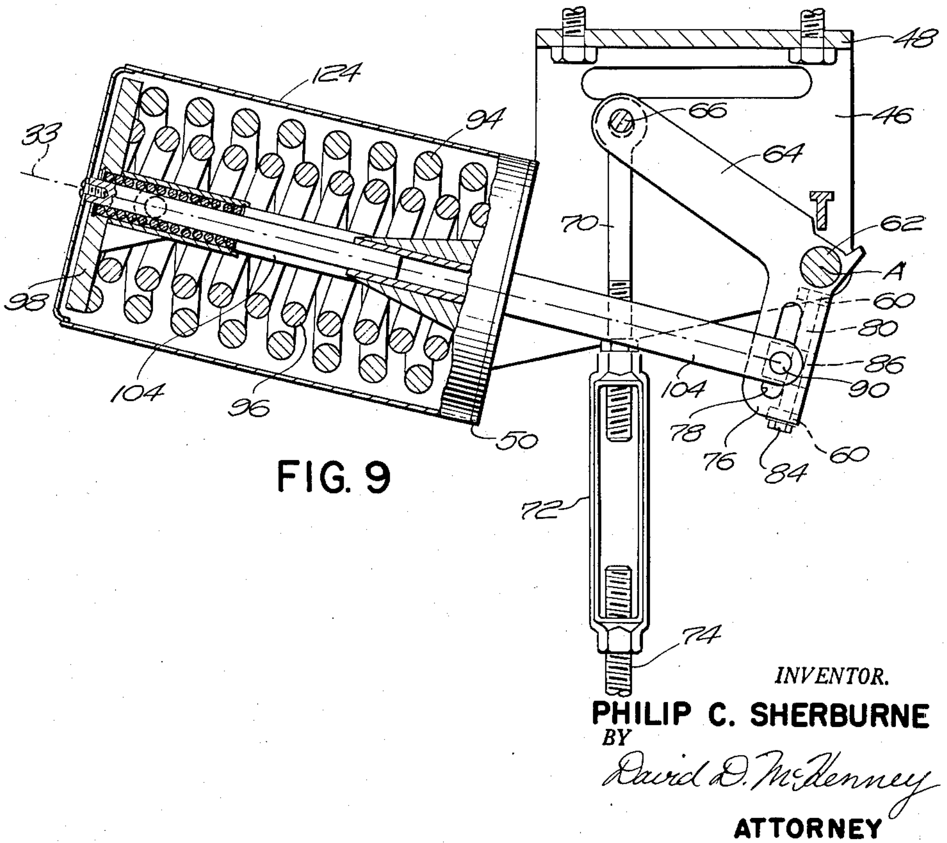
Figure 10:
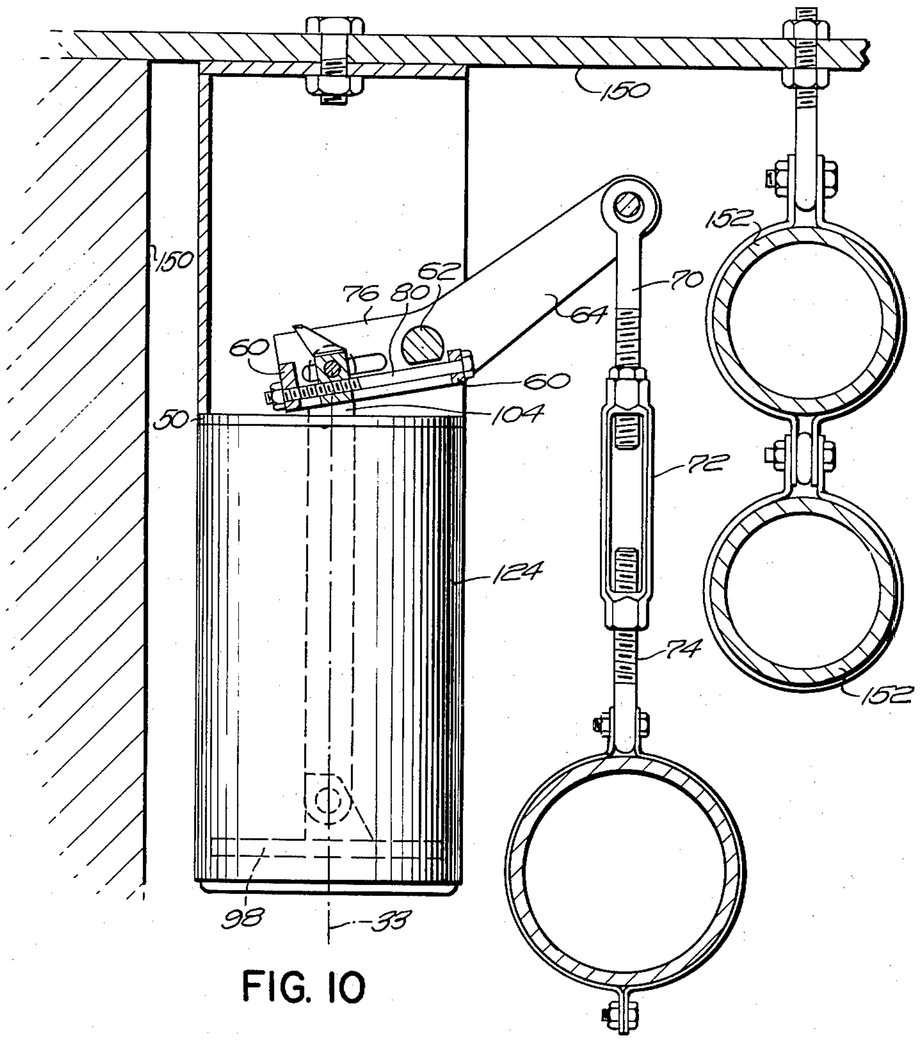
Figures 11, 12:
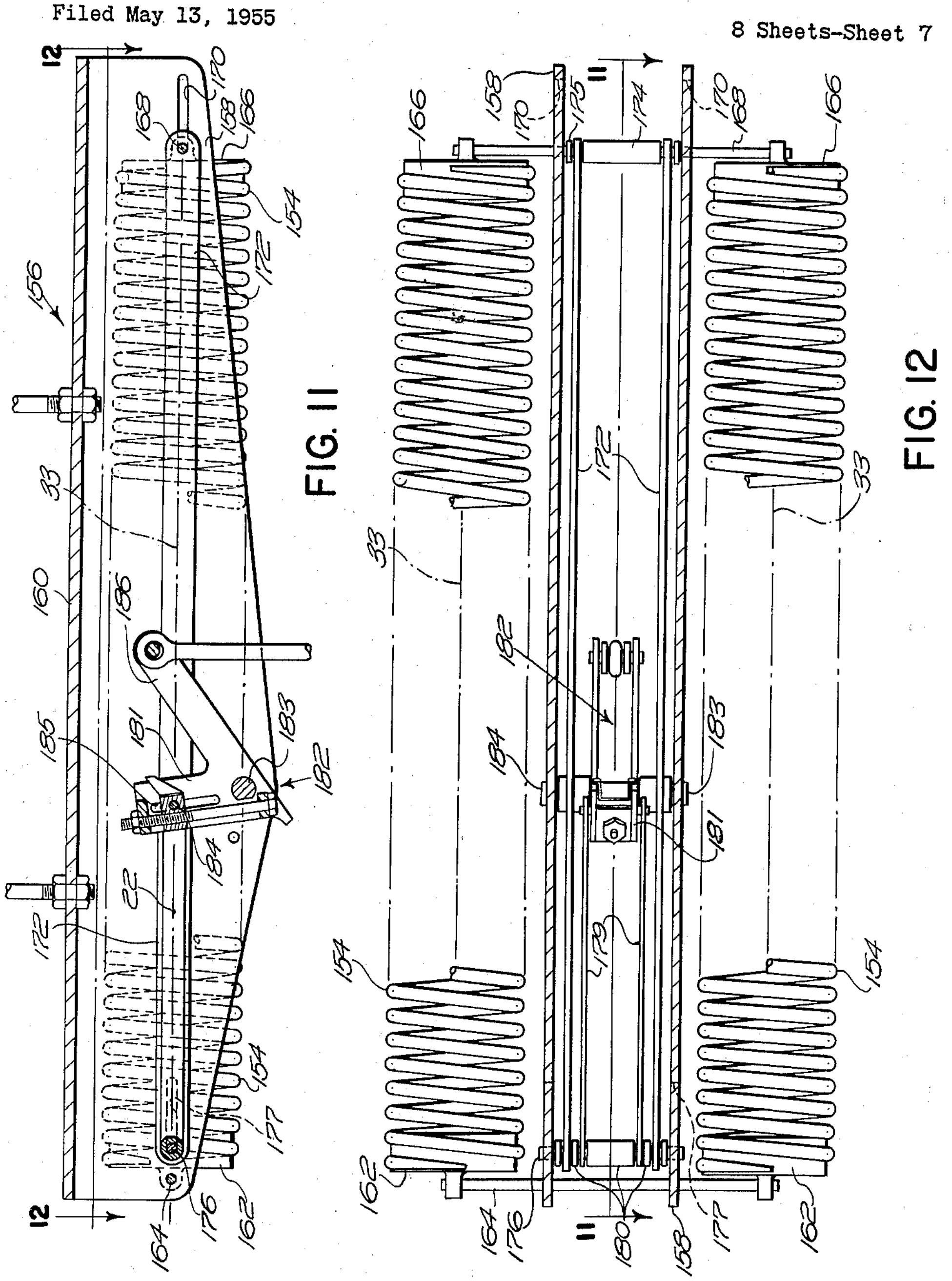
Figure 13:
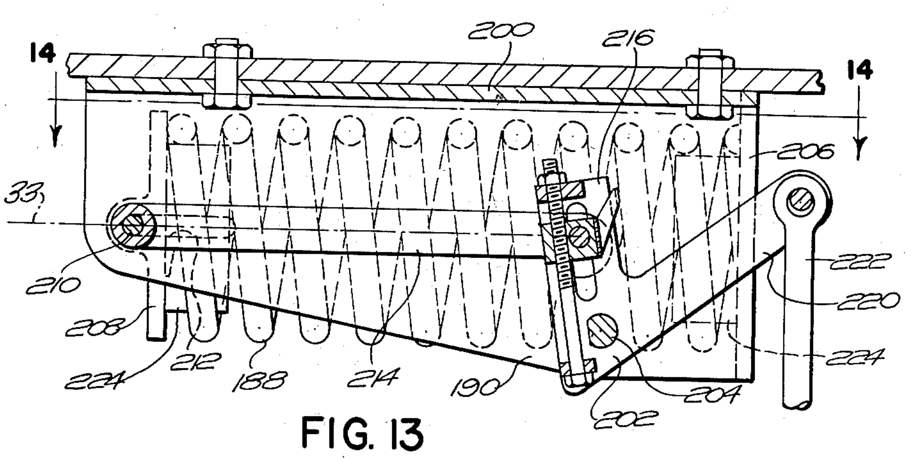
Figure 14:
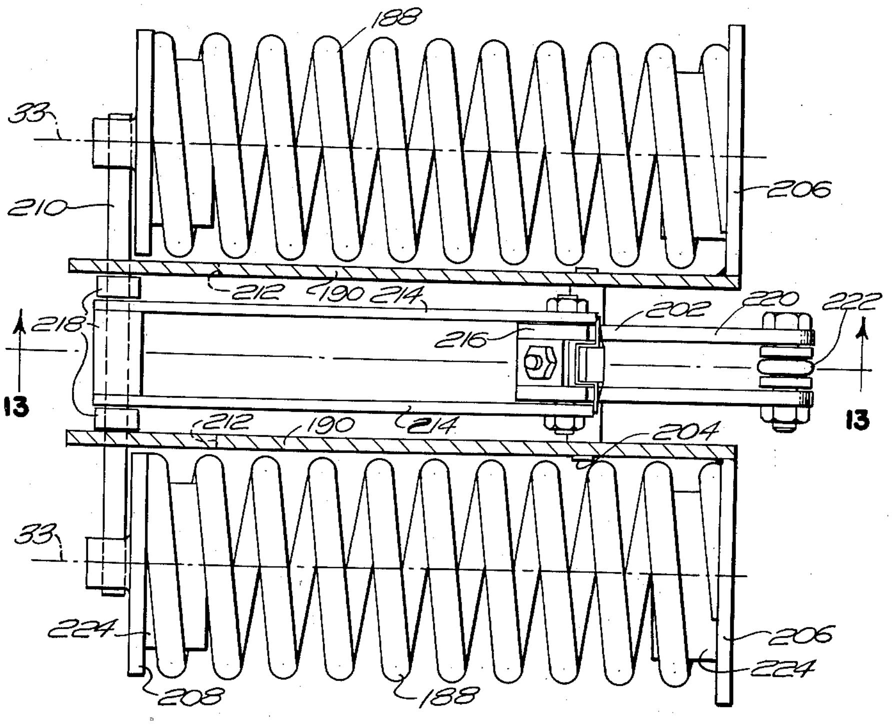

Figs. 5, 6 and 7 are end elevation and end cross-section views taken on lines 5—5, 6—6 and 7—7, respectively, of Fig. 4;

Fig. 8 is a side elevation view of one portion of the device of Fig. 4;

Fig. 9 is a view like Fig. 3 but showing another embodiment of the invention in which the spring axis is not horizontal;

Fig. 10 is a partially sectioned side elevation view of a device in which the spring axis is vertical;

Fig. 11 is a sectioned side elevation view of an embodiment of the present invention employing an extension spring and having "center support";

Fig. 12 is a view taken on line 12—12 of Fig. 11;

Fig. 13 is a sectioned side elevation view of an embodiment in which the springs extend alongside of the lever;

Fig. 14 is a view taken on line 14—14 of Fig. 13; and

Figures 2, 15:
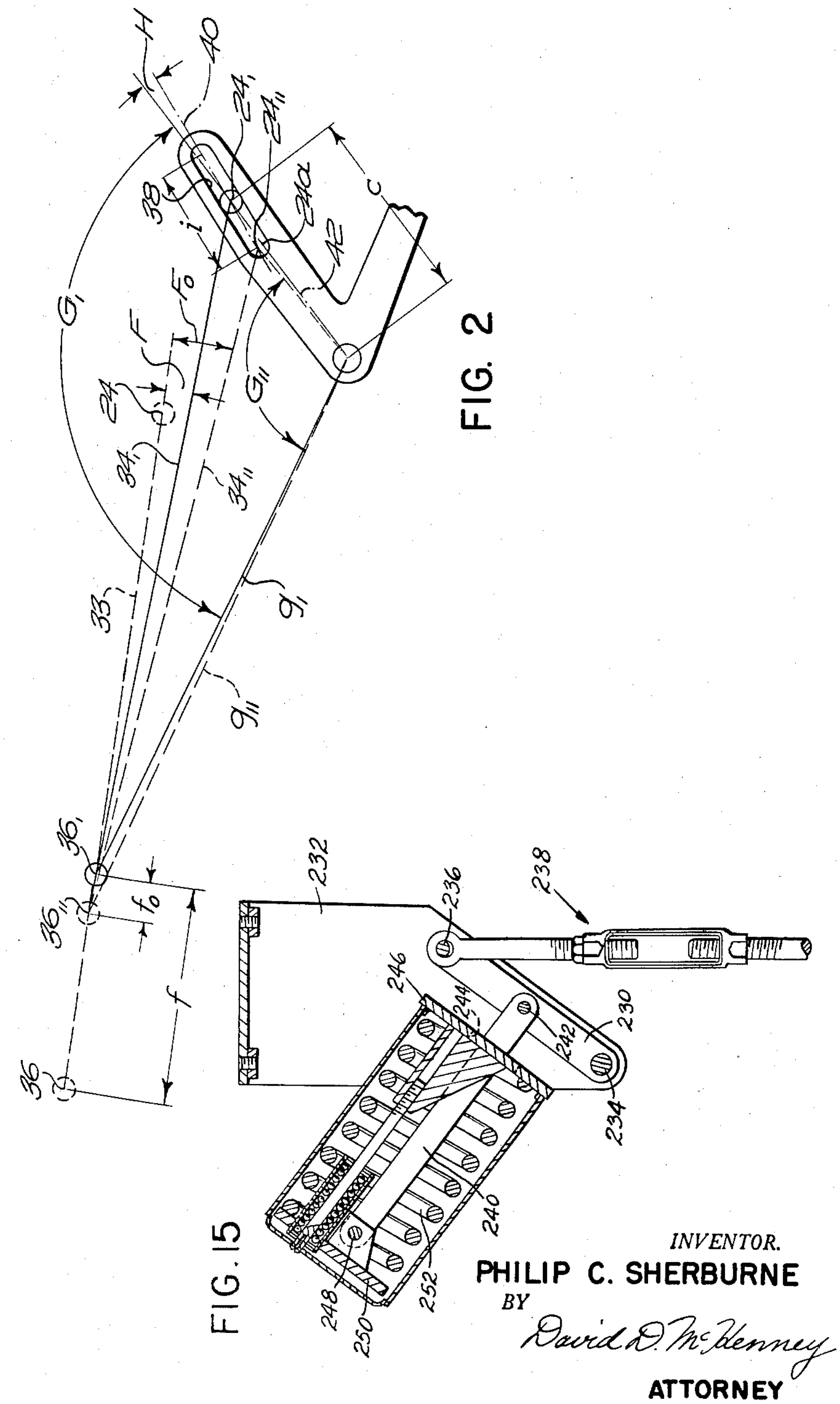
Fig. 2 is a fragmentary diagrammatic side elevation view of an embodiment similar to that of Fig. 1, but showing provision for adjustment with the important dimensions and angles thereof.

Fig. 15 is a sectioned side elevation view of still another embodiment of the present invention.

Figure 1:
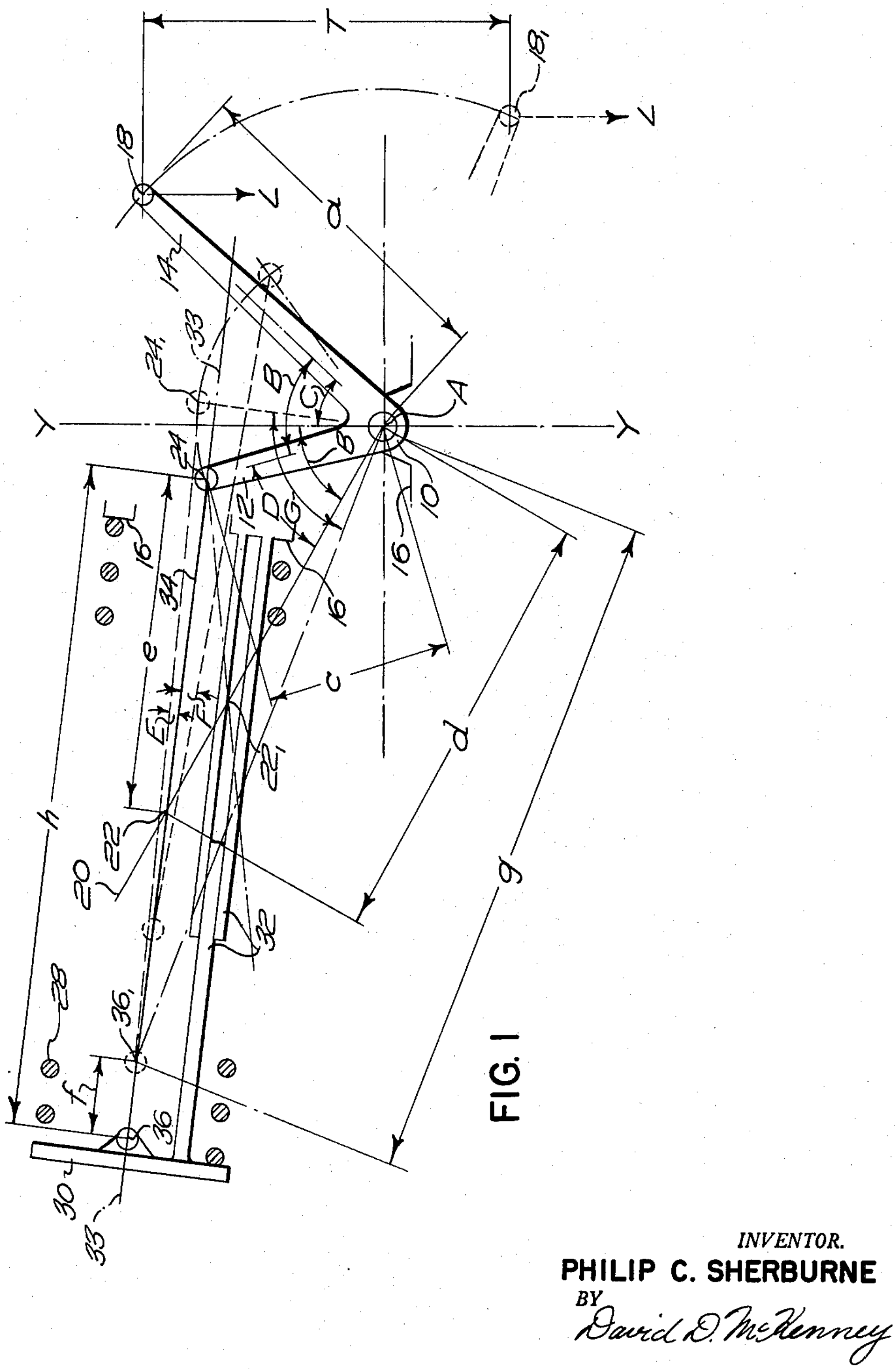
Fig. 1 is a diagrammatic side elevation view of one embodiment of the present invention showing dimensions and angles involved in the determination of the degree of constancy of support.

Referring now more particularly to the drawings, the diagrammatic view of Fig. 1 illustrates the mode of operation of a device according to the invention. A lever 10 having a spring arm 12 and a load arm 14 is pivoted to a fixed frame 16 to rotate about a pivot axis A. These arms are spaced apart about the axis A by an angle B. A weight load L is pivotally suspended from the load arm 14 at 18 and hangs vertically downward for any position of the lever within its working rotational range.

In Fig. 1 the heavy lines show the position of the lever when the lever is at one end of this working rotational range and the dotted outline of a fragment of the load arm indicates at $\mathbf{18_1}$ the position of this arm when the lever is at the other end of this range. The total vertical travel of the load L which this rotation of the lever will accommodate is indicated by the distance T.

Before considering the actual spring arrangement utilized and shown it is necessary to consider the prior arrangement which is not specifically shown but from which the arrangement of the present invention represents a selected departure. This prior arrangement can be described with reference to Fig. 1. Thus, the axis Y—Y through the lever pivot A is parallel to the line of action of the load L and is therefore vertical in this case because the load is a suspended weight. Measuring counterclockwise (as seen in Fig. 1) about the pivot A from the portion of axis Y—Y extending above this pivot by the angle B between the lever arms provides a line 20. If, at any selected point on this line 20, for example point 22, a spring having a linear force-deflection characteristic had one non-deflectable end pivotally mounted to the frame so that the normal deflection line of the spring (i.e. the longitudinal axis of a helical spring) lay on a line including the point 22 and a point 24 on the spring arm 12, and if the other deflectable end of such a spring extended to the left (in Fig. 1) of point 22 and were pivotally secured to the point 24 by a tie-rod, and if the spring were guided so that its normal deflection line lay on line 22—24 for any rotative position of the lever, and if the distance from point 22 to point 24 equalled the spring deflection, the following moment equation could be written with respect to forces on the lever about pivot A for any rotative position of the lever:

$$La \sin C = \frac{Kbcd \sin D}{e} \quad (1)$$

where

L is the weight of the load L,
$a$ is the length of the load arm 14,
K is the spring constant,
$b$ is the total spring deflection,
$c$ is the length of the spring arm 12,
$d$ is the distance from pivot A to point 22,
$e$ is the distance between point 22 and 24,
C is the angle the load arm makes with Y—Y, and
D is the angle between the spring arm and line A—22.

However, it will be noted from the above description of this prior arrangement that for any rotative position of the lever angles C and D will be equal and $b$ will equal $e$. Accordingly, Equation 1 may be written:

$$L = \frac{Kcd}{a} \quad (2)$$

and since K, $c$, $d$ and $a$ all have fixed values theoretically perfect constant support is achieved merely by selecting for K, $c$, $d$ and $a$ values which make the expression $$\frac{Kcd}{a}$$

equal to the load L.

This prior arrangement, while desirable in that it provides such theoretically perfect constant support, has the distinct disadvantage that the spring rotates about the pivot at point 22 while the lever 10 rotates to accommodate movement of the load. Thus, as has been stated, in this prior arrangement the spring is guided so that the normal deflection line of the spring, which, for example, would be the longitudinal spring axis in the case a helical spring, always lies along the line 22—24. Hence, when point 24 follows its arcuate path about pivot A upon lever rotation, the spring rotates or oscillates about pivot point 22. Furthermore, it is required of devices of this kind that they be adjustable to provide support for a range of different loads. This is normally accomplished by adjusting the point 24 on the spring arm along the radial line A—24, or by adjusting the point 22 along the line 20. From Equation 2 it is seen that these adjustments change $c$ and $d$, respectively, and a new value for the expression $$\frac{Kcd}{a}$$

results without effecting the perfection of support.

However, such adjustments also result in shifting of the spring, for if the point 22 is moved to a new location $22_1$ (shortening $d$) then the spring will be moved so that its normal deflection line lies along line $22_1$—24 which represents a shift of the spring from the position in which its normal deflection line lay along line 22—24. After such adjustment rotation of the lever would cause the spring to oscillate about point $22_1$.

This spring oscillation due to lever rotation and spring shift due to adjustment are undesirable because of the allowances which must be made for them during installation of the devices. In the device shown such oscillation and shift are avoided while the basic features of the prior arrangement which result in perfect supporting characteristics are substantially retained.

Initially, the amount of lever rotation to accommodate movement of the load is determined. Next a spring 28 having a linear force-deflection characteristic (in Fig. 1 this is a helical compression spring) is mounted on the frame 16 with one end fixed with respect thereto and with the other, deflectable end provided with an engaging member 30. This engaging member 30 is guided, for example by the telescoping guides 32, so that the spring may only be deflected substantially along its normal line of deflection, which, in this case, is its longitudinal axis 33.

A tie-rod 34 has one of its ends pivotally connected to the engaging member 30 at 36 and has its other end pivotally connected to the spring arm of the lever at 24. The spring is so mounted that throughout the rotation of the lever to accommodate the total movement of the load the line 36—24 does not depart appreciably from the spring axis 33 on either side thereof.

This arrangements is illustrated in Fig. 1 where the positioning of the spring has been chosen so that the line 36—24 actually coincides with the spring axis 33 when the lever is at one end of its range of rotation, and further chosen so that the extremes of departure of the line 36—24 from axis 33, as the lever rotates to the other end of its range, are represented by small angles E and F. It will be noted that with this arrangement the force which the spring exerts on the lever through the tie-rod 34 very nearly passes through the theoretical point 22 on the spring axis 33. Thus, the only differences between the operation of the present invention, as embodied in Fig. 1 and as thus far described, and the prior arrangement previously explained is that in the present invention the spring exerts its force on the lever along a line 36—24 which (1) is not always coincidental with the spring axis 33 and therefore (2) does not always pass through point 22.

In the prior arrangement it is a feature that the spring deflection $b$ equal the distance 22—24. Similarly, in the present invention the spring deflection is made to equal this distance as nearly as possible. For example, in Fig. 1 the point 24 lies on the spring axis 33 when the lever is at the end of its rotational range. If, as is preferred, the spring is deflected so that in this position of the lever the distance from 24 to the point 22 (where line 20 intersects the spring axis 33) is equal to this spring deflection, then for each other position of the lever within its range the spring deflection will closely approximate the deflection for the corresponding position in the prior arrangement. To the extent that this spring deflection in the present invention departs from the corresponding deflection of the prior arrangement another difference is introduced.

The effect of these combined differences is to cause the theoretical spring moment to fail to exactly equal the theoretical load moment at substantially every position of the lever within its range. However, because of the novel arrangement of parts the maximum difference in these theoretical moments may be kept within acceptable limits for a range of rotation of the lever which is satisfactorily large.

In this connection it is to be noted that for any given range of lever rotation any load movement can be accommodated by changing the length of the load arm $a$. Accordingly, it would not appear to be an advantage to rotate the lever through a large range because of the supporting errors such large rotation introduces, and in fact it would appear to be best to restrict lever rotation to a very small range. The difficulty with such a small lever rotation range and long load arm is that it either requires a very powerful spring on a short spring arm or a spring with very large amount of available deflection on a long spring arm. In practice the most efficient use of material and the most compact device is realized by employing a substantial range of lever rotation.

In the arrangement of the present invention the expression for the theoretical moment $M_s$ exerted by the spring on the lever about pivot A is as follows (considering the general case in Fig. 1 where the pivot of the tie-rod to the spring arm is in the dotted position indicated at $24_1$):

$$M_s=\frac{K(e+f)gc \sin G}{\cos Eh}$$

where

K is the spring constant,
$e$ is the spring deflection (equal to the distance 22—24) when the lever is in the position shown in solid lines,
$f$ is the additional spring deflection resulting from rotation of the spring arm pivot to position $24_1$,
$g$ is the distance from pivot A to $36_1$,
$c$ is the length of the spring arm,
G is the angle $24_1$—A—$36_1$,
$h$ is the length of the tie-rod 34, and
E is the angle by which the line of force exerted along the tie-rod departs from the spring axis 33.

The load moment $M_1$ of the device in Fig. 1 is expressed as:

$$M_L=La \sin C \quad (4)$$

For the design of any given construction in accordance with the broad features of this invention those skilled in this art will appreciate that after values are chosen for $a$, B, $c$, and $h$, after the range of total lever rotation is selected and after the spring axis 33 is properly positioned, the values of $e$, $f$, $g$, G and E are trigonometrically related and some of these may be expressed in terms of others. Thus, in calculating the theoretical spring moment $M_s$ for the purpose of determining the maximum extent to which it departs from the theoretical load moment it is not necessary to actually measure all of these dimensions and angles. However, it is not deemed necessary to set forth some or all of these trigonometric relationships here, inasmuch as they are simple to those skilled in this art and will readily occur, and inasmuch as the actual measurement of these quantities is a completely satisfactory expedient and may even be preferred.

The present invention is not considered as limited to a construction of the kind described which maintains the inequality of theoretical spring and load moments within certain limits, because there are no such limits which may be considered critical for all devices in which the invention may be utilized to advantage. However, it is important to note that in the pipe hanger field devices are presently considered fully satisfactory if the departure from theoretically perfect constant support does not exceed two percent of the load, and such conditions may be easily met under the present invention with total ranges of lever rotation which are large enough to provide very efficient use of materials, for example ranges of lever rotation up to sixty degrees.

Adjustment of devices in accordance with the present invention, while resembling the adjustment of the described prior arrangement, is different and novel in that it serves not only to increase or decrease the effective spring moment arm $c$ but also tends to correct additional errors in supporting characteristics attributable to the change in such moment arms. Thus, referring to Fig. 2, the adjustment shown there is on the spring arm whereby the pivotal connection 24 is adjustable in a slot 38 in this arm. The slot axis 40 extends along the spring arm at a small angle H with respect to a radial line 42 from pivot A. This radial line 42 is drawn to intersect the slot axis substantially midway along the slot.

In Fig. 2 the points 24 and 36 indicate the position of the tie-rod 34 when the lever is at the end of its range shown in heavy lines in Fig. 1. The points $24_1$ and $36_1$ indicate the position of the tie-rod after lever rotation but without adjustment, and the points $23_{11}$ and $36_{11}$ indicate the tie-rod position after both lever rotation and adjustment.

Bearing in mind that the spring moment expression is:

$$M_s=\frac{K(e+f)}{\cos F}\cdot\frac{g_1 c \sin G_1}{h} \quad (5)$$

when the tie-rod 34 is below the spring axis 33, as in position $24_1$ of Fig. 2, it will be seen that if the pivot of the tie-rod to the lever were moved toward pivot A along radial line 42, for example to a location 24$a$, the effect would be to increase both angle F and angle $G_1$ and in other respects depart further from those features of the described prior arrangement which make for perfect theoretical support. As a result new errors in support are introduced solely by such adjustments. However, some type of adjustment is necessary, and it has been discovered that while radial adjustment is practical, it is preferred to arrange the slot as shown, with the slot axis 40 at a slight angle H to a radial line 42 which intersects this axis at approximately the center of the range of adjustment. With this preferred arrangement the errors in support attributable to adjustment are minimized. The slot axis is further disposed with respect to the radial line 42 so that it passes between the pivot A and the pivot 36 at the said slight angle H with respect to the radial line 42.

The spring moment expression for the position of the tie-rod indicated by points $24_{11}$ and $36_{11}$ is:

$$M_s=\frac{K(e+f-f_0)}{\cos F_0}\cdot\frac{g_1 c \sin G_{11}}{h} \quad (6)$$

The value of angle H is not critical since the benefit derived from its employment will vary and depend upon the proportions of the various parts of the entire structure. An example of a satisfactory value for angle H in a pipe hanger construction having the proportions of Fig. 3 is five degrees. It will be understood that the proportions of Figs. 1 and 2 were chosen primarily for clear showing of the angles and dimensions here described. The example gives practical dimensions and angles.

*Example*

An example of an actual practical device made in accordance with Figs. 1, 2 and 3 of the drawings of the present invention is set forth in the following dimensions and angles for that position of the lever shown in these figures in which the load is in its uppermost position.

$K$=100 pounds per inch.
$e$=10.339 inches.
$f$=0 inch.
$g$=21.891 inches.
$c$=4.550 inches.
$G$=59° 40′.
$h$=20.000 inches
$E$=0°
$H$=5°.
$i$=1.900 inches With a total rotation range of the lever of 52° the calculated error in supporting effect afforded by such a construction does not exceed one half of one percent of the load.

Fig. 3 shows a more detailed embodiment of the present invention in a pipe hanger having a frame 44 with depending side plates 46, a top wall 48 extending between these side plates and an end wall 50 also extending between the side plates. The top wall 48 is provided with threaded holes 52 therethrough and nuts 54 welded to the inner surface of the wall around these holes. By rods (not shown) threaded into these holes and these nuts the frame may be secured to some fixed overhead structure such as a building frame.

A lever 56 comprising a pair of identical plates 58 secured together in separated relation by cross pieces 60 is pivoted between the side plates 46 on a shaft 62 having its end journalled in these side plates. Corresponding and adjacent arms 64 on the lever plates extend in one direction from the axis A of the shaft 62 to form a lever load arm. A pin 66 extending between the lever plate arms 64 at a distance from axis A is encircled between the arms 64 by the eye 68 on one end of an eye rod 70. The other end of this eye rod is threaded into a turnbuckle 72 which connects this eye rod 70 to a rod 74 which is in turn connected to a pipe section (not shown).

Additional corresponding and adjacent arms 76 on the lever plates 58 extend in another direction from the shaft axis A to form a lever spring arm. These plate arms 76, however, are provided with aligned slots 78. A threaded bolt 80, journalled at its ends for easy rotation in the cross pieces 60 and held in position by a head 82 at one end and a nut 84 at the other, extends parallel to these slots 78 but to one side of the space between them. Threaded on the bolt 80 is a block 86 which slides easily between the plate arms 76 and has a portion 88 extending into the space between the slots. This block portion 88 has a pin 90 mounted therein with its ends extending through the slots 78 and beyond the outside plate surfaces. By this arrangement rotation of the bolt 80 in one direction or the other by turning its head 82 moves the block 86 along this bolt and carries the ends of pin 90 along the slots 78. A sheet metal pointer 92 is secured to the block portion 88 and bent around to the outside surface of one or both of the lever plates where a scale may be secured to indicate the amount of movement which is achieved when bolt 80 is turned.

The surface of the end wall 50 opposite the lever 56 serves as a bearing for the ends of nested compression springs 94 and 96. The other ends of these springs are engaged by a spring plate 98 having a pair of brackets 100 secured thereto so as to extend part way into the smaller spring 96. These brackets are spaced apart approximately the same distance as the lever plates 58 are spaced and serve as supports for a pin 102 extending between them substantially perpendicular to and intersecting the coincidental axes 33 of the springs. The ends of this pin 102 extend beyond the outer bracket surfaces and have pivoted thereon the ends of tie-rods 104. These tie-rods extend along the space in the center of the smaller spring 96, pass through an opening 106 in the end wall 50, and have their other ends pivotally secured to the ends of pin 90.

The edges 108 of the spring plate 98 and the outer surfaces of the coils of spring 94 are closely confined by a rigid spring cover 109 secured to the end wall 50 and having its inside surfaces 110 which confine the spring plate and coils parallel to the spring axes 33.

The lever plates 58 are each provided with integral lugs 112 which are adapted to engage a stop 114 on end wall 50 to limit the clockwise (as seen in Fig. 3) rotation of the lever 56.

Fig. 4 shows a pipe hanger similar to that of Fig. 3 except that the springs are guided to deflect only along their axes 33 by a telescoping guide rather than by the spring casing. This guide comprises a plunger 116 secured to the end wall 50 by having one end threaded into a tube 118 secured to and standing out from this wall. The tube is disposed so that the plunger extends parallel to axes 33, and the tube 118 is braced by a member 120. The other end of plunger extends loosely through an opening 122 in the spring engaging member 98 and may be secured to a spring dust cover 124 as at 126. Since this cover is not required to guide the springs, as in Fig. 3, it may be considerably lighter, and the connection at 126 will serve to help support it. A cylindrical member 128 secured to the spring engaging member 98 and extending around the plunger 116 houses a ball bearing unit 130 for permitting sliding of the plunger 116 in the member 128 with a minimum of friction. Since the tube 118 is secured to the end wall 50 relatively near the spring axes 33 in Fig. 4, an opening in this end wall like opening 106 of Fig. 1 cannot be employed to accommodate the tie-rods 104, and instead two narrower openings 132 are used. Also in this Fig. 4 the pin 66 on the lever load arm is shown positioned farther from the pivot A than in Fig. 3. This illustrates that this pin may be located at any desired position on the load arm depending on the size of the load and the amount of load travel which must be accommodated.

Figs. 5 and 6 show that the spring engaging member 98 is provided at the edges with enlargements 134 in which are mounted short pins 136 for properly locating the outer spring 94 on this member 98. These figures also show that the ends of tie-rods 104 are held in position on the ends of pin 102 by nuts 138. Fig. 7 shows that the other ends of tie-rods 104 are held in position on the ends of pin 90 by nuts 140, and further shows spacers 142 holding the lever 56 centered between frame side plates 46.

Fig. 8 is a side elevation of the frame, unsectioned showing an adjustment scale 144 for the adjustment points 92 and showing a pointer 146 on the end of lever pivot shaft 62. The lever 56 is secured to this shaft 62 so that the pointer 146 in conjunction with a scale 148 on the frame side plate 46 indicates the amount of rotation of the lever.

Figs. 9 and 10 illustrates that the spring axis 33 may be located at any desired position with respect to the line of action of the load. It is merely necessary to provide a lever having a spring arm so positioned with respect to the spring axis 33 that throughout the rotation of the lever necessary to accommodate load movement the position of the tie-rods does not depart substantially from this axis, and to further provide a spring deflection which is substantially equal to the distance between the pivotal connection of the tie-rod to the spring arm and the point where a line which is drawn from the pivot of the lever on the frame and which is angularly spaced from the vertical through the latter pivot intersects the line defined by the tie-rod pivots. In referring to the tie-rods not departing substantially from the spring axis, what is meant is that when viewed along the axis A of the lever pivot the line connecting the pivots at the ends of each tie-rods does not depart substantially from coincidence with the spring axis 33 or does not depart substantially from a position parallel to the spring axis. In referring to the line drawn from the pivot A angularly spaced from the vertical through this pivot, what is meant is that such a line is drawn in the view as seen along axis A, and the angle is measured from the vertical extending above the axis A in the same direction that the spring arm is disposed by this angle from the load arm. In referring to the vertical through the axes A, it will be appreciated that the vertical is employed as a reference line because the load acts vertically downward on the load arm. This is a special case, though the one always encountered in pipe hangers, and the more general reference line from which the angle is measured is a line extending from pivot A parallel to and in the opposite direction to the line of action of the load.

In Fig. 9, unlike the prior figures, the guiding means is coincidental with the spring axes 33. Except for this, for the different spring axes location and for minor alterations in arrangements of parts the previous description and designating numerals apply.

Similarly, Fig. 10 is another arrangement embodying the invention which shows that the spring axes 33 may even be vertical. In the case of a spring pipe hanger such an arrangement is often very desirable where other nearby equipment, such as the building frames 150 and pipes 152 shown in Fig. 10, do not leave room for constant support hangers with springs horizontally or substantially horizontally disposed.

Figures 11 and 12 illustrate an embodiment of the invention in which helical tension springs 154 are employed, rather than the compression springs of the other figures. In addition this embodiment of Figs. 11 and 12 incorporates a feature known in this art as "center support" whereby the parts are arranged so that the load is vertically suspended from substantially the center of the overall horizontal dimension of the device. In general the size of the springs accounts for the size of these devices, and where the springs are horizontally disposed "center support" must be accomplished by having the springs pass to the sides of the lever. The present invention is particularly well suited for this disposition of the springs on the sides of the lever because it requires a tie-rod in any event, and it is by means of tie-rods that the deflectable end of a spring is best connected to the lever spring arm in achieving "center support."

In Figs. 11 and 12 there are two extension springs 154 arranged one on each side of a frame 156 which comprises spaced walls 158 and a top wall 160 thereacross. Each spring 154 has an end plug 162 in one end thereof secured to a shaft 164 mounted on the frame and extending outward on either side thereof. The other end of each spring is also provided with an end plug 166 similarly secured to a shaft 168 which is mounted in a pair of slots 170 in the frame walls 158 and which extends outward on either side thereof. These slots are disposed so that movement of the shaft 168 therealong is restricted to a path parallel to the axes 33 of the springs 154. Between the frame walls 158 there is pivotally secured to the shaft 168 a pair of separated tie-rods 172 spaced apart on the shaft 168 by a spacer 174 and from the frame walls by additional spacers 175. These tie-rods extend back between the frame walls 158 to another shaft 176 mounted in additional slots 177 in the frame walls. These additional slots also extend parallel to the spring axes 33, and the ends of the shaft 176 mounted therein do not extend far enough out from the outside frame wall surfaces to interfere with the springs 154. The tie-rods 172 are spaced from the inside surface of the frame walls by spacers 178. Between the separated tie-rods 172 is a second pair of separated tie-rods 179 each having one of its ends pivotally connected to the shaft 176. These second tie-rods are separated from each other and from the tie-rods 172 by spacers 180, and extend back between the tie-rods 172 to the spring arm 181 of a lever 182 which is pivoted to the frame between the frame walls on a shaft 183. Each tie-rod 179 is pivoted to one end of a short shaft 184 mounted in an adjustment slot 185 in the spring arm 181. This slot 185 is positioned as previously described and mechanism (not shown) is provided for adjustably positioning the shaft 184 in this adjustment slot. The load is suspended from a point on the load arm 186 of the lever 182.

In the position of the lever 182 actually shown in Figs. 11 and 12 it will be noted that the line defined by the pivots of tie-rods 179 coincides (in Fig. 11) with the spring axes 33. It will also be noted that for substantial lever rotation (clockwise in Fig. 11) produced by downward movement of the load the springs will be further extended along their axes 33, but that the line defined by the pivots of tie-rods 179 will not depart substantially from coincidence with these axes 33 as viewed in Fig. 11. The distance from the axis of the shaft 184 to a point 22 substantially equals the spring deflection in the position shown.

Figures 13 and 14 show still another embodiment of the invention illustrating that helical compression springs 188 may also be employed in an arrangement in which the springs are disposed on the sides of the lever. Thus, one result of the "center support" above described is that the overall length of the hanger is not substantially greater than the overall length of the horizontal spring, or, in other words, the horizontal space occupied by the lever in its various rotational positions falls between the spring ends, and no part of the hanger length is solely attributable to the lever. That this benefit can be realized to a lesser extent than in the "center support" arrangement by some overlapping of spring and lever is illustrated in Figs. 13 and 14. The total hanger length here is attributable to the length of the horizontal spring and to a portion of the space occupied by the lever.

In this arrangement of Figs. 13 and 14 the frame is comprised of two spaced side wall members 190 connected together at the top by a top wall member 200 by which the frame is normally secured to a building structure. A lever 202 having the same construction as the lever in Fig. 3 is pivoted to the frame between the side wall members on a shaft 204 which has its ends journalled in these side wall members. Each spring 188 has one of its ends abutted against a fixed spring end plate 206 extending outward from the outer surface of a side-wall member at the end of the frame. From this end each spring extends along the frame, beyond the lever, to its other end near the other end of the frame. At this other end each spring is provided with a cap 208 which is fixedly mounted on the end of a shaft 210. The center portion of this shaft is mounted in and slidable along grooves 212 which are formed the side wall members 190 and which extend parallel to the spring axes 33. Between the side wall members the shaft 210 carries the ends of two separated tie-rods 214 which extend between these members substantially parallel to the spring axes 33. The other tie-rod ends are secured to the spring arm 216 of the lever 202 in the manner already described. Spacers 218 separate the tie-rods from each other and from the side wall members on the shaft 210. The load (not shown) is suspended from the load arm 220 of the lever 202 by the eye-rod 222. Spring retaining short cylinders 224 hold the compression springs in place on the plates 206 and caps 208. The spring deflection in the position shown is substantially equal to the distance between the axis of the pivot of the tie-rods to the spring arm 216 and the point 22 on the axes 33 (as seen in Fig. 13).

In the arrangement of Fig. 15 a lever 230 is employed which has a single arm serving as both the load arm and the spring arm. This lever is pivoted to a frame 232 at a pivot 234 and has a load (not shown) suspended from a pivot 236 thereon by a rod and turn-buckle assembly 238. A tie-rod 240 is also pivotally connected to the lever 230 at pivot 242 on the line 234—236 and extends through an opening 244 in plate 246 to a pivotal connection 248 at another plate 250. The plate 246 is non-rotatably fixed to the frame 232 and serves to support one end of a spring 252, while the plate 248 engages the other spring end. Thus in most respects the device of Fig. 15 is similar to the devices previously described. The difference is that the lever 230 has but a single arm and the lever, spring and tie-rod are therefore arranged so that the spring deflection equals the distance from the pivot 242 to the intersection of the tie-rod line 242—248 with a radial line extending vertically upward from the lever pivot 230. In other words, this is an arrangement where the angle between the arms of the lever is O so that the angle measured from a vertical line extending upward from the lever pivot is also O.

Through the foregoing the levers have been shown and referred to as having distinctly separate load and spring arms. It will be understood, however, that the lever may comprise a continuous plate with the pivots and connections located at appropriate places thereon in accordance with the teachings. With such a "continuous plate" lever the spring and load arms would still exist in the mathematical sense, and it is in this sense which the term "arm" is employed.

Also in the foregoing the load has been shown in each case of a pipe hanger, but it will be understood that a rigid connection of the load to this load arm may be employed. In such a case the mathematical load arm with which the description is concerned would extend from the pivot of the lever on the frame to the center of gravity of the load.

Also in the foregoing it has been explained that a preferred arrangement is the one in which the tie-rods are exactly parallel to the spring axis when the lever is at one end of its angular range which is predetermined by vertical load movement, as is shown for example in Fig. 3. It is to be understood, however, that the present invention comprehends those other arrangements in which the tie-rods are exactly parallel to the spring axis in some other position of the lever within its predetermined angular range or even in which the tie-rods are exactly parallel to the spring axis in a position of the lever somewhat beyond the ends of its predetermined angular range. The important thing is that the tie-rods remain generally parallel to the spring axis throughout movement of the lever within its predetermined angular range.

To further describe that relationship of the spring axis to the spring arm of the lever which is within the present invention, it may be defined in terms of a tangent drawn to the arcuate path of tie-rod pivot on the spring arm. Thus, as the lever rotates within its predetermined angular range this last-mentioned pivot traces an arcuate path. The tie-rods will remain generally parallel to the spring axis if in addition to their being exactly or substantially parallel in one lever position, as above described, the spring is disposed on the frame with its axis substantially parallel to a tangent drawn near the center of this arcuate path.

In the earlier description herein reference was made to the spring deflection being equal to the distance between the tie-rod pivot on the spring arm and the point 22 when the lever is at one end of its predetermined angular range. It will be understood that with this preferred arrangement the spring deflection throughout rotation of the lever within its predetermined angular range very closely approximates the corresponding distance in that previous described arrangement (spring swings) which provides theoretically perfect constant support in any position of the lever. It is also within the present invention, however, to have the spring deflection equal the distance between the tie-rod pivot to the spring arm and a point 22 (which is the intersection of the line defined by the tie-rod pivots and line 20 in Figure 3) at a lever position which does not represent one end of its predetermined angular range, because the spring deflection will still very closely approximate the corresponding spring deflection of the theoretically perfect arrangement. Otherwise stated, if the spring deflection in the present arrangement is for any one position of the lever within its predetermined angular range substantially equal to the corresponding spring deflection of the theoretically perfect arrangement (in which the spring swings) then the spring deflection will closely approximate that of the theoretically perfect arrangement for every position of the lever within its predetermined angular range.

Finally in the foregoing the preferred tie-rods have been described in which they are pivoted with respect to the spring end. It will be understood, however, that since the tie-rods remain generally parallel to the spring axis during operation of the device a rigid connection of the tie-rods to this spring end would be within this invention, allowing the flexibility of the spring to take care of the amount by which the tie-rods do not remain parallel to the spring axis.

I claim:

1. A device for exerting on a load a constant force in a predetermined direction, said device comprising a frame, a lever pivoted to said frame for rotation within an angular range of movement about the axis of said pivot, said lever having a load arm and a spring arm, means on said load arm adapted to have the load connected thereto, a spring having a substantially linear force-deflection characteristic when deflected along an axis of said spring, means for fixedly mounting one portion of said spring on said frame with said spring axis at said mounting means being fixed with respect to said frame during rotation of said lever and with said spring axis intersecting a first radial line drawn from said lever pivot, a tie-rod pivotally connected at a first point thereon to said spring arm at a distance from said lever pivot axis and pivotally connected at a second point thereon to a movable portion of said spring, a guiding member on said frame restricting movement of said second point to a path substantially parallel to said spring axis, said spring being so mounted on the frame with respect to the lever that in each rotational position of the lever within said range of movement a tie-rod line defined by the said two points forms a slight angle with but remains generally parallel to said spring axis, and said spring having a deflection substantially equal to the distance between said first point and a third point on said tie-rod line, said third point being the intersection of said tie-rod line with said first radial line, said first radial line being angularly spaced about the lever pivot axis from a second radial line in the same rotational direction as the spring arm is spaced from the load arm and by an angle equal to the smaller angle between said lever arms, and said second radial line extending from said lever pivot axis in said predetermined direction.

2. A device as set forth in claim 1 in which said spring is a helical spring and in which said means for mounting said spring locates a part of said spring on one side of the angular range of spring arm rotation.

3. A device as set forth in claim 1 in which said spring is a helical spring and in which said means for mounting said spring locates substantially the mid-part of said spring on one side of the angular range of spring arm rotation.

4. A device as set forth in claim 1 in which said spring is a helical compression spring, in which said means for mounting said spring locates said one spring portion adjacent one end of the angular range of spring arm rotation, and in which said tie-rod passes within said helical compression spring.

5. A device as set forth in claim 1 in which said spring is a helical spring and in which said guiding member engages the surfaces of the spring coils.

6. A device as set forth in claim 1 in which said spring is a helical spring, in which a plate engages the movable portion of said spring, in which said second point on the tie-rod is pivotally connected to said plate, and in which said guiding member engages a portion of said plate exteriorly of said spring.

7. A device as set forth in claim 1 in which said spring is a helical spring, in which a plate engages the movable portion of said spring, in which said second point on the tie-rod is pivotally connected to said plate, and in which said guiding member is located substantially within said spring and engages a portion of said plate.

8. A device as set forth in claim 1 in which said spring is a helical spring, in which a plate engages the movable portion of said spring, in which said guiding member comprises a first rigid member secured to the frame and a second rigid member carried by said plate, in which at least one of said rigid members extends parallel to said spring axis, and in which said rigid members engage each other for relative movement only along said spring axis.

9. A device as set forth in claim 1 in which said first point is adjustable on said spring arm along a substantially straight line passing between said lever pivot axis and said second point.

10. A device for exerting a constant force in one direction on a body movable in said one direction through a limited range of movement, said device comprising a frame, a lever pivoted to the frame for rotation about a first axis included in a first plane, said lever having a load arm and a spring arm each extending radially from said first axis, means pivotally connecting the body to said load arm for rotation of said load arm with respect to said body about an axis hereinafter called the second axis which is parallel to said first axis and defines therewith a second plane, a helical spring deflected along an axis of said spring and having a linear force-deflection characteristic when so deflected, means for fixedly mounting one end of said spring on the frame with said spring axis at said mounting means being fixed with respect to said frame during rotation of said lever and with said spring axis intersecting a third plane which includes the first axis, a tie-rod having one end pivotally connected to said spring arm at a distance from said first axis for rotation of said tie-rod with respect to said spring arm about an axis hereinafter called the fourth axis which is parallel to said first axis and defines therewith a fourth plane, said fourth plane being angularly disposed about the first axis in one rotational direction from the second plane, said tie-rod having the other end pivotally connected to the movable other end of said spring for rotation of said other tie-rod end with respect to said movable spring end about an axis hereinafter called the fifth axis which is parallel to said fourth axis and defines therewith a fifth plane, a guiding member carried by said frame and associated with said movable spring end for restricting movement of the said other tie-rod end to a path substantially parallel to said spring axis, and means for mounting said frame with said first plane extending in said one direction and said first axis perpendicular to said one direction, said spring being positioned with respect to the lever so that in one position of the body within its range of movement the tie-rod is parallel to the spring axis and in every other position of the body within its range of movement the tie-rod forms a slight angle with but remains generally parallel to said spring axis, said spring having a deflection for each position of the body within its range substantially equal to the distance between the fourth axis and the line on the third plane where said third plane is intersected by said fifth plane, and said third plane being angularly disposed in said one rotational direction from the first plane by an angle equal to the smaller angle between said second and fourth planes.

11. A device as set forth in claim 10 in which said guiding member is fixed with respect to said frame and has a surface engaging exterior surface portions of the coils of said helical spring, in which said surface is smooth and permits free movement therealong of the said coil surface portions in engagement therewith as said spring is deflected, and in which said surface restricts spring movement to a path only along said spring axis.

12. A device as set forth in claim 10 in which said helical spring is a compression spring, in which a plate engages the said movable end of said spring, in which said other end of the tie-rod is pivotally connected to said plate, and in which said guiding member is fixed with respect to said frame and has a surface extending parallel to said spring axis in sliding engagement with a portion of said plate exterior to said spring, whereby deflection of said spring is restricted to movement along said spring axis only.

13. A device as set forth in claim 10 in which said helical spring is a compression spring, in which a plate engages the movable end of said spring, in which said other end of the tie-rod is pivotally connected to said plate, in which said guiding member comprises an elongated first cylindrical member fixed with respect to said frame within said spring and having its axis of elongation extending parallel to said spring axis, and in which said guiding member further comprises a hollow second cylindrical member fixed with respect to said plate and receiving said first cylindrical member therein for relative motion of said first cylindrical member with respect to said second cylindrical member along said spring axis, whereby deflection of said spring is restricted to movement along said spring axis only.

14. A device as set forth in claim 10 in which said helical spring is an extension spring, in which a spring plug is fixedly secured in the movable end of said spring, in which said spring plug carries a pivot shaft having an axis forming the said fifth axis and the said other end of the tie-rod is pivotally connected to said shaft, and in which said guiding member comprises an elongated slot extending parallel to the said spring axis and receiving therethrough said pivot shaft, whereby deflection of said spring is restricted to movement along said spring axis only.

15. A device as set forth in claim 10 in which the pivoted connection of the tie-rod to the spring arm is adjustable on said spring arm along a substantially straight adjustment line, in which said adjustment line provides for increases and decreases in the distance between the first and fourth axes, and in which said adjustment line passes between said first and fifth axes substantially closer to said first axis than to said fifth axis.

16. A device as set forth in claim 10 in which said spring arm rotates through an angular range in a sixth plane perpendicular to the first axis as the body moves through said limited range, and in which said means for mounting said one end of said spring locates the spring on the frame with at least one portion of the spring extending along side said angular range, whereby the spring overlaps the lever and the overall dimension of the device measured along the spring axis is minimized.

17. A device as set forth in claim 10 in which said load arm rotates through an angular range in a sixth plane perpendicular to the first axis as the body moves through said limited range, and in which said means for mounting said one end of said spring locates the spring on the frame with substantially the center portion of the spring length measured along the spring axis extending along side said angular range, whereby the load is secured to the device at a point adjacent substantially said spring center portion.

18. A device as set forth in claim 10 in which said helical spring is a compression spring having a passage therewithin, in which said spring arm rotates through an angular range in a sixth plane perpendicular to the first axis, in which said means for mounting one end of said spring locates said one spring end adjacent one end of said spring arm angular range, whereby the said passage within said spring opens directly upon said spring arm, and in which said tie-rod passes along said spring within said passage.

19. A spring hanger for exerting on fluid handling equipment a vertical force which opposes the weight of said equipment and the contents thereof and which is substantially equal to said weight throughout a limited range of vertical movement of the equipment caused by changes in temperature of the fluid, said hanger comprising a frame, a lever pivoted to said frame for rotation about an axis hereinafter called the first axis included in a first plane, a spring arm and a load arm on said lever each extending radially outward from said first axis, means for fixedly mounting said frame with said first axis substantially horizontal and said first plane extending substantially vertically upward from said first axis, a helical spring deflected along the longitudinal axis of said spring and having a substantially linear force-deflection characteristic when deflected along said spring axis, a spring-mounting fixedly mounting one end of said spring on the frame, an elongated tie-rod having one end pivotally secured to a point on said spring arm spaced apart from said first axis for rotation of said tie-rod with respect to said spring arm about an axis hereinafter called the second axis which is parallel to said first axis and forms therewith a second plane, said tie-rod having the other end pivotally secured to the other end of said spring for rotation of said tie-rod with respect to said other spring end about an axis hereinafter called the third axis which is parallel to said second axis and forms therewith a third plane, whereby force exerted by said deflected spring is exerted on said spring arm and produces a turning moment on said lever in one rotational direction about said first axis, means for pivotally connecting the equipment to a point on said load arm spaced apart from said first axis for rotaton of said load arm with respect to said load about an axis hereinafter called the fourth axis which is parallel to said first axis and forms therewith a fourth plane, whereby the weight of said equipment exerts a force on said load arm and produces a turning moment on said lever in the opposite rotational direction about said first axis, and a guiding member on the frame restricting movement of said other spring end to a path along said spring axis, said lever rotating through a predetermined angular range of movement about said first axis as the equipment moves vertically through said limited range of movement, said second axis following an arcuate path about said first axis as said lever rotates through said predetermined angular range of movement, said spring mounting positioning said spring on the frame with said spring axis substantially parallel to a tangent drawn to said arcuate path near the center thereof, and said third plane being substantially parallel to said spring axis in one position of the lever within its predetermined angular range of movement.

20. A hanger as set forth in claim 19 in which the spring deflection in one position of the lever within said predetermined angular range substantially equals the distance along the third plane between the second axis and a line which is in said third plane and which is parallel to said second axis, said line being the intersection of said third plane by a fifth plane including said first axis, said fifth plane being angularly spaced in a selected rotational direction about said first axis from said first plane, said angular spacing being equal to the smaller angle between said second and fourth planes, and said selected rotational direction being the direction in which said angle is measured from said fourth plane to said second plane.

21. A hanger for exerting on a load movable vertically within a limited range of movement a vertical supporting force substantially equal to the weight of the load throughout said limited range of movement, said hanger comprising a frame, a lever pivoted to said frame at a pivot and having a load arm and a spring arm each extending radially outward from said pivot, a spring deflected along one axis thereof and having substantially linear force-deflection characteristic when deflected along said axis, a spring mounting fixedly mounting a first portion of said deflected spring on the frame, an elongated spring force transmitting member pivotally secured at a first point thereon to said spring arm and secured at a second point thereon which is spaced a substantial distance from said first point to a second unfixed portion of said deflected spring, whereby force exerted by said deflected spring is transmitted to said spring arm and produces a turning moment on said lever in one direction about said pivot of the lever to the frame, means for connecting the load to said load arm, whereby the weight of the load produces a turning moment on said lever in the opposite direction about said pivot of the lever to the frame, and a guiding member restricting movement of said second spring portion to a path along said spring axis, said lever rotating through a predetermined angular range of movement as the load moves vertically through said limited range of movement, said first point on the spring force transmitting member following an arcuate path of limited length as said lever rotates through said predetermined angular range of movement, said spring mounting positioning said spring on the frame with said spring axis substantially parallel to a tangent drawn to said arcuate path near the center portion thereof, and said spring force transmitting member being substantially parallel to said spring axis in one position of the lever within its predetermined angular range of movement, the deflection of said spring in one position of the lever within said predetermined angular range of movement being substantially equal to the distance between the first point on the spring force transmitting member and a third point, said third point being on a first line defined by said first and second points and being the intersection of said first line by a second line drawn radially from the pivot of the lever on the frame, said second line being angularly spaced in one rotational direction from a third line also drawn radially from said pivot of the lever on the frame, said angular spacing being equal to the smaller angle between the spring and load arms, said one rotational direction being the rotational direction in which the spring arm is angularly spaced from the load arm, and said third line extending vertically upward.

22. A device for exerting on a load a constant force in a predetermined direction, said device comprising a frame, a lever pivoted to said frame for rotation within an angular range of movement about the axis of said pivot, said lever having a single arm, means on said arm adapted to have the load connected thereto, a spring having a substantially linear force-deflection characteristic when deflected along an axis of said spring, means for fixedly mounting one portion of said spring on said frame with said spring axis at said mounting means being fixed with respect to said frame during rotation of said lever and with said spring axis intersecting a first radial line drawn from said lever pivot, a tie-rod pivotally connected at a first point thereon to said arm at a distance from said lever pivot axis and pivotally connected at a second point thereon to a movable portion of said spring, a guiding member on said frame restricting movement of said second point to a path substantially parallel to said spring axis, said spring being so mounted on the frame with respect to the lever that in each rotational position of the lever within said range of movement a tie-rod line defined by the said two points forms a slight angle with but remains generally parallel to said spring axis, and said spring having a deflection substantially equal to the distance between said first point and a third point on said tie-rod line, said third point being the intersection of said tie-rod line with said first radial line, said first radial line extending from said lever pivot in said predetermined direction.

23. A constant force exerting device comprising a frame, a lever pivoted on the frame for rotation within an angular range of movement about a main pivot, said lever having a load arm and a spring arm, means connected to said load arm and adapted to transmit said constant force vertically and perpendicular to the axis of said main pivot, a spring deflectable along an axis of said spring, means for mounting one end of said spring on the frame with said spring axis at said mounting means extending in a direction fixed with respect to said frame during lever rotation and with said spring axis intersecting a first radial line drawn from said main pivot, a tie-rod pivotally connected at a first point to said spring arm at a distance from said main pivot and connected at a second point to said spring, a guiding member restricting movement of said second point to a path substantially parallel to said spring axis, said spring being so mounted on the frame with respect to the lever that in substantially each position of the lever within said angular range of movement a tie-rod line defined by the said points forms a slight angle with but remains generally parallel to said spring axis, and said spring having a deflection which, in each position of the lever within said angular range, remains substantially equal to the distance between the said first point and a third point where said tie-rod line is intersected by said first radial line, said first radial line being spaced about the main pivot from a second radial line in the same rotational direction as the spring arm is spaced from the load arm and by an angle equal to the smaller angle between said arms, and said second radial line extending vertically from said main pivot.

References Cited in the file of this patent

UNITED STATES PATENTS

| | | |
|---|---|---|
| 1,937,135 | Wood | Nov. 28, 1933 |
| 2,004,539 | Rossman | June 11, 1935 |
| 2,159,870 | Wert | May 23, 1939 |
| 2,208,064 | Wood | July 16, 1940 |
| 2,535,305 | Loepsinger | Dec. 26, 1950 |
| 2,618,449 | Kohler | Nov. 18, 1952 |
| 2,709,057 | Gould | May 24, 1955 |
| 2,756,014 | Leibfried | July 24, 1956 |

FOREIGN PATENTS

| | | |
|---|---|---|
| 132,399 | Australia | Aug. 7, 1947 |